US011687681B2

(12) United States Patent
Gueron et al.

(10) Patent No.: US 11,687,681 B2
(45) Date of Patent: Jun. 27, 2023

(54) MULTI-TENANT CRYPTOGRAPHIC MEMORY ISOLATION

(71) Applicant: Intel Corporation, Santa Clara, CA (US)

(72) Inventors: Shay Gueron, Haifa (IL); Siddhartha Chhabra, Hillsboro, OR (US); Nadav Bonen, Ofer (IL)

(73) Assignee: INTEL CORPORATION, Santa Clara, CA (US)

( * ) Notice: Subject to any disclaimer, the term of this patent is extended or adjusted under 35 U.S.C. 154(b) by 101 days.

(21) Appl. No.: 17/020,486

(22) Filed: Sep. 14, 2020

(65) Prior Publication Data

US 2021/0103682 A1  Apr. 8, 2021

Related U.S. Application Data

(63) Continuation of application No. 15/720,360, filed on Sep. 29, 2017, now Pat. No. 10,776,525.

(51) Int. Cl.
| | |
|---|---|
| *H04L 29/00* | (2006.01) |
| *G06F 21/79* | (2013.01) |
| *G06F 21/75* | (2013.01) |
| *G06F 21/76* | (2013.01) |
| *G06F 12/14* | (2006.01) |
| *G06F 21/62* | (2013.01) |

(52) U.S. Cl.
CPC .............. *G06F 21/79* (2013.01); *G06F 12/14* (2013.01); *G06F 21/75* (2013.01); *G06F 21/76* (2013.01); *G06F 21/6218* (2013.01)

(58) Field of Classification Search
CPC .......... G06F 21/79; G06F 12/14; G06F 21/75; G06F 21/76; G06F 21/6218

USPC ......................................................... 713/193
See application file for complete search history.

(56) References Cited

U.S. PATENT DOCUMENTS

| | | | |
|---|---|---|---|
| 8,972,746 B2 | 3/2015 | Johnson et al. | |
| 9,614,670 B1* | 4/2017 | Ghetti | ................. H04L 63/0428 |
| 10,776,525 B2 | 9/2020 | Gueron et al. | |
| 2011/0255689 A1 | 10/2011 | Bolotov et al. | |
| 2013/0013934 A1* | 1/2013 | King | ....................... G06F 21/79 |
| | | | 713/190 |

(Continued)

OTHER PUBLICATIONS

U.S. Appl. No. 15/720,360, U.S. Pat. No. 10,776,525, filed Sep. 29, 2017, Multi-Tenant Cryptographic Memory Isolation.

(Continued)

*Primary Examiner* — Brandon Hoffman
*Assistant Examiner* — Michael D Anderson
(74) *Attorney, Agent, or Firm* — Jaffery Watson Mendonsa & Hamilton LLP

(57) ABSTRACT

System and techniques for multi-tenant cryptographic memory isolation are described herein. A multiple key total memory encryption (MKTME) circuitry may receive a read request for encrypted memory. Here, the read request may include an encrypted memory address that itself includes a sequence of keyid bits and physical address bits. The MKTME circuitry may retrieve a keyid-nonce from a key table using the keyid bits. The MKTME circuitry may construct a tweak from the keyid-nonce, the keyid bits, and the physical address bits. The MKTME circuitry may then decrypt data specified by the read request using the tweak and a common key.

23 Claims, 6 Drawing Sheets

(56) References Cited

U.S. PATENT DOCUMENTS

2019/0095350 A1    3/2019   Durham et al.
2019/0102577 A1    4/2019   Gueron et al.

OTHER PUBLICATIONS

"U.S. Appl. No. 15/720,360, Non Final Office Action dated Aug. 2, 2019", 9 pgs.

"U.S. Appl. No. 15/720,360, Response filed Nov. 4, 2019 to Non Final Office Action dated Aug. 2, 2019", 9 pgs.

"U.S. Appl. No. 15/720,360, Notice of Allowance dated May 8, 2020", 9 pgs.

* cited by examiner

| FIELD | OFFSET | SIZE | COMMENTS |
|---|---|---|---|
| KEYID | 0 | 2 | KEY DOMAIN IDENTIFIER |
| KEYID_CTRL | 2 | 3 | KEY DOMAIN CONTROL:<br>BITS [7:0]: COMMAND<br>BITS [23:7]: ENC ALG |
| RSVD | 5 | 59 | RSVD, MBZ |

FIG. 4

MULTI-TENANT CRYPTOGRAPHIC MEMORY ISOLATION

PRIORITY APPLICATION

This application is a continuation of U.S. application Ser. No. 15/720,360, filed Sep. 29, 2017, which is incorporated herein by reference in its entirety.

TECHNICAL FIELD

Embodiments described herein generally relate to encrypting main memory and more specifically to multi-tenant cryptographic memory isolation.

BACKGROUND

Computer memory may include several devices, such as random access memory (RAM) technologies (e.g., static RAM (SRAM), dynamic RAM (DRAM), etc.), flash memory, magnetic hard disk drives, etc. Main memory is distinct from other computer memories in that it provides data in a manner directly usable by processing circuitry, such as central processing units (CPUs), graphic processing units (CPUs), etc. Thus, main memory is generally byte addressable, as opposed to page or block addressable, and is used to maintain an operating state of processing circuitry, distinguishing it from storage memories that may not be directly compatible with the processing circuitry (e.g., they are not byte addressable), or use long-term storage data structures to hold data outside of the current operate state of main memory (e.g., a RAM disk holding a filesystem).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates an example matrix of a data structure to program an MKTME engine, according to an embodiment.

DETAILED DESCRIPTION

Figure 1:
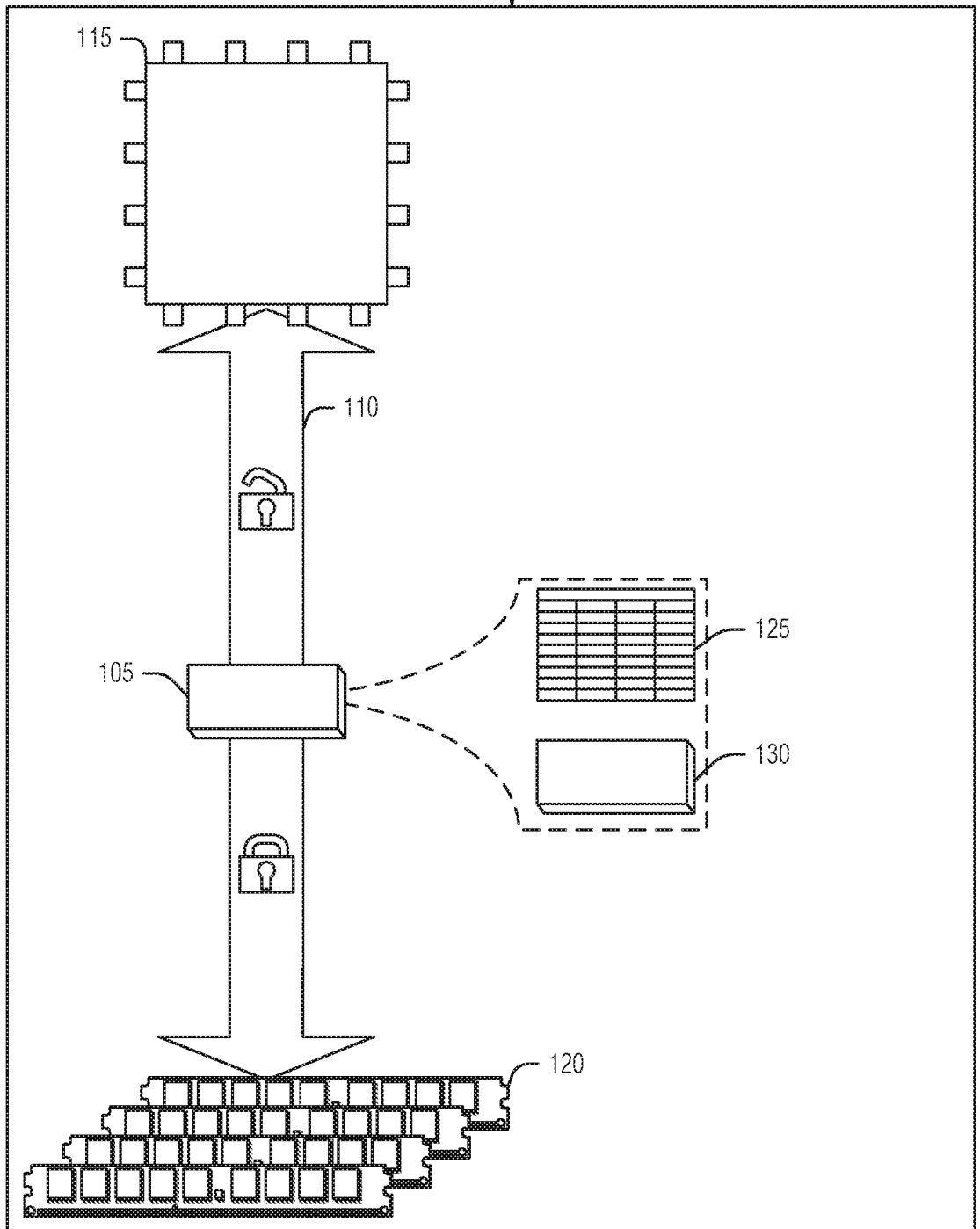
FIG. 1 is a block diagram of an example of an environment including a device for multi-tenant cryptographic memory isolation, according to an embodiment.

User data security is an ongoing concern with contemporary computer systems. Some systems employ disk (e.g., storage and not main memory) encryption to protect data at rest. However, data in main memory presents unique problems as it is the staging area or scratchpad for most processing circuitry. Thus, data in main memory is often stored as plaintext (e.g., unencrypted) and is vulnerable to attacks. Attackers may use a variety of techniques to retrieve main memory data, such as bus scanning or memory scanning to obtain sensitive data (e.g., user keys, passwords, etc.).

To address the data security problems of current main memory systems, a variety of solutions have been proposed. For example, cryptographic hardware has been created to implement a memory encryption engine in the main memory path—e.g., an application specific integrated circuit (ASIC) on a memory bus between a CPU and the main memory—to encrypt data before it is stored in the main memory. Some technologies, such as Software Guard Extensions (SGX) use the memory encryption engine to protect data when it is resident in memory, providing all of confidentiality of the data, protection against data tampering, and prevention of data replay. Memory encryption engines typically include a single key, that may be re-programmable, to encrypt and decrypt the memory on-the-fly as it is written and read by a processor or other memory consumer (such as a network interface card, video card, etc.).

Cloud Service Providers (CSPs) often host several different tenants (e.g., users, domains, etc.) on a single piece of hardware. The traditional memory encryption engine technique of a single key begins to breakdown when these disparate, and possibly untrusting entities, now have a common encryption, open the possibility of cross-tenant (e.g., cross domain) attacks. CSPs now often have a requirement to cryptographically isolate customer data and workloads from themselves as well as from other tenants. While traditional memory encryption engines provide a foundation for meeting CSP needs, they do not provide the cryptographic isolation to provide protection between distrusting parties (e.g., one tenant workload from another or tenant workload from CSP).

A multi-key total memory encryption (MKTME) engine has been proposed to provide key-based cryptographic isolation between tenants on a single hardware platform. Generally, MKTME isolates the tenant workloads from each other and from the CSP using one key per tenant workload. While each tenant or tenant workload is now cryptographically isolated from each other, the size of cryptographically secure keys (e.g., 256 bits or greater) imposes significant demands on memory internal to the MKTME hardware. That is, the number of concurrent tenant workloads that may be supported with MKTME is reduced to the number of keys that may be stored in MKTME engine.

To address the storage and tenant workload scaling problem, while still maintaining tenant workload and CSP isolation, MKTME engines may be modified to use a single key set across tenant workloads (e.g., a common key set) and use a unique cryptographic tweak for each tenant workload. The common key set may include one or more keys, however, the same keys of the common key set are used for every tenant workload. The tweak is an additional input to a cipher that may result in a different result given the same key and data. Thus, data from different domains (e.g., tenants or tenant workloads) is encrypted differently when domain specific tweaks are used even if the key is the same. The tweaks may be based on memory addresses, a unique identifier for the tenant (e.g., a keyid), and a nonce. The nonce is an ephemeral value that is used to make it difficult to attack the tweak. As the other elements of the tweak are provided to the MKTME, the MKTME need only store the nonce. The nonces, may be smaller than the keys themselves, resulting in increased, scaling (e.g., the number of independent tenants) supported with the same hardware (e.g., die area) of the MKTME. Thus, where traditional MKTME may support thirty-two 256-bit keys, this disclosure permits 128 nonces that are 64 bits in size. The unique combination of domain specific (e.g., domain-unique) tweaks instead of multiple keys allows CSPs to meet cryptographic memory isolation goals in a hardware efficient manner. Additional details and examples are described below.

FIG. 1 is a block diagram of an example of an environment including a device 105 for multi-tenant cryptographic memory isolation, according to an embodiment. The device 105 is part of a computing system 135 that includes main memory hardware 120 and a CPU 115 connected by a bus 110. The device 105 may be implemented in many ways, such as an addition to the CPU package, or as part of a motherboard chipset, or the like. The device 105 includes processing circuitry 130 to perform the operations of the device 105, and storage 125 to, for example, securely maintain a key table. The device 105 may be referred to as a MKTME engine. The computing system 135 is arranged to service multiple tenants, such as tenant 140, tenant 150, and tenant 160.

The device 105 provides main memory 120 encryption and decryption to the CPU 115, or other main memory 120 user (e.g., a GPU, interface card, etc.). Thus, the device 105 is arranged to receive a read request for encrypted memory. Although the read request may originate from any main memory 120 user, for simplicity of explanation, the CPU 115 is making the request. The read request includes an encrypted memory address, which is an address for encrypted memory and not an encrypted form of a memory address. In an example, the encrypted memory address includes a sequence of keyid bits and physical address bits. That is, the encrypted memory address includes a keyid to identify, for example, tenant 140, and a valid address for the main memory 120 to identify from where to read the data. In an example, the device 105 is on a communications path between the main memory 120 and requesting hardware (e.g., the CPU 115). In an example, the communications path is a front-side memory bus of a motherboard. Placing the device 105 directly on the memory bus between the CPU 135 and the main memory 120 defends against, for example, bus probing attacks to read sensitive data.

The device 105 is arranged to retrieve a keyid-nonce from a key table (e.g., held in the secure storage 125) using the keyid bits. Here, the keyid functions as an index to the key table and the keyid-nonce is a nonce that corresponds to (e.g., is assigned to, is unique to, etc.) the keyid. Other data structures may be used, however, such as a linked list with a keyid-nonce tuple, a tree, etc. In an example, the keyid-nonce is 64 bits. As noted below, 64 bits provides sufficient entropy to ensure strong encryption of the data while still providing ample space in the storage 125 to support many tenants.

The keyid-nonce is set when a keyid is registered with the device 105. Registration may be performed by, for example, a virtual machine monitor (VMM) or operating system (OS) running on the system 135. The registration may include a request for a keyid. Often, the number of keyid supported by the device is limited by size, or a set number of preset keyids. Because tenant workload, or particular tenants are not known in advance, generally, tenant requests (or those handled by a VMM for a tenant workload) include a request for a keyid. To prevent replay attack problems, upon a keyid request (e.g., a key-update command), a new nonce is used. In an example, the keyid-nonce is included in the keyid request. In an example, the device 105 is arranged to create the keyid-nonce in response to the key-update command. In either case, the device 105 is arranged to store the new keyid-nonce in the key table (e.g., in storage 125). In an example, to create the keyid-nonce, the device 105 is arranged to generate a random number the size of a keyid-nonce (e.g., generate a random number modulus the keyid-nonce size). In an example, software running on the system 135, such as an operating system, VMM, etc., instructs the processor 115 to perform the registration (e.g., request to program the keyid). Microcode for the system 135 may then generate the nonce. The device 105 coordinates the acceptance of the request, generation of the nonce, and the storage of the nonce along with the registered keyid in the storage 125.

The device 105 is arranged to construct a tweak from the keyid-nonce, the keyid bits, and the physical address bits. In an example, the tweak is a concatenation of the keyid-nonce, the keyid bits, and the physical address bits. In an example, the order of the concatenation includes starting with the keyid-nonce bits, appending the keyid bits to the keyid-nonce bits, and then appending the physical address bits to produce a single bit string.

The device 105 is arranged to use the tweak and a common key set to decrypt data specified by the read request with the encrypted memory address. Here, the common key set is a single set of keys used by the device 105 without regard to which of several tenants or tenant workloads is being encrypted or decrypted. For example, workload data for tenant 140 is encrypted using the same key from the common key set as workload data for tenant 160. The difference between the encryption of these workloads is in the tenant, or domain, specific tweaks created from the tenant specific keyid-nonces held in the storage 125 from the keyid registration. In an example, the decryption is accomplished by performing Advanced Encryption Standard (AES) XEX-based tweaked-codebook mode with ciphertext stealing (XTS) (AES-XTS) decryption, where the AES-XTS keys K1 and K2 are in the common key set (e.g., the same K1 and K2 are used for all tenant workloads) and the tweak is unique across mutually distrusting domains. The following represents the traditional multi-key AES-XTS technique:

T=AES (K2, Tweak)
PP=P XOR T
CC=AES (K1, PP)
C=CC XOR T

Where P is the plaintext, C is the ciphertext generated, and K1 and K2 are domain-specific keys. Thus, in this last example, K1 and K2 are from the common key set and not domain specific keys, but the tweak is specific to the domains.

A similar set of techniques as those described above to read encrypted data from the main memory 120 are used to encrypt data to store in main memory 120. Thus, the device 105 is arranged to receive a write request for the encrypted memory. Again, the write request includes the encrypted memory address. The device 105 retrieves the keyid-nonce from the key table using the keyid bits and constructs the tweak from the keyid-nonce, the keyid bits, and the physical address bits. The tweak, in conjunction with the common key set, are then used by the device 105 to encrypt data specified by the write request. The encrypted data may then be stored in the main memory 120 at the physical address in the encrypted memory address.

The device 105 provides traditional MKTME functionality of multi-tenant cryptographic memory isolation while allowing for a greater number of tenants to be serviced by the same storage 125 size than was traditionally possible. This is advantageous for CSPs, allowing a greater number of untrusting workloads to share a single system 135 with confidence that the data will be secure between tenants.

Figure 2:
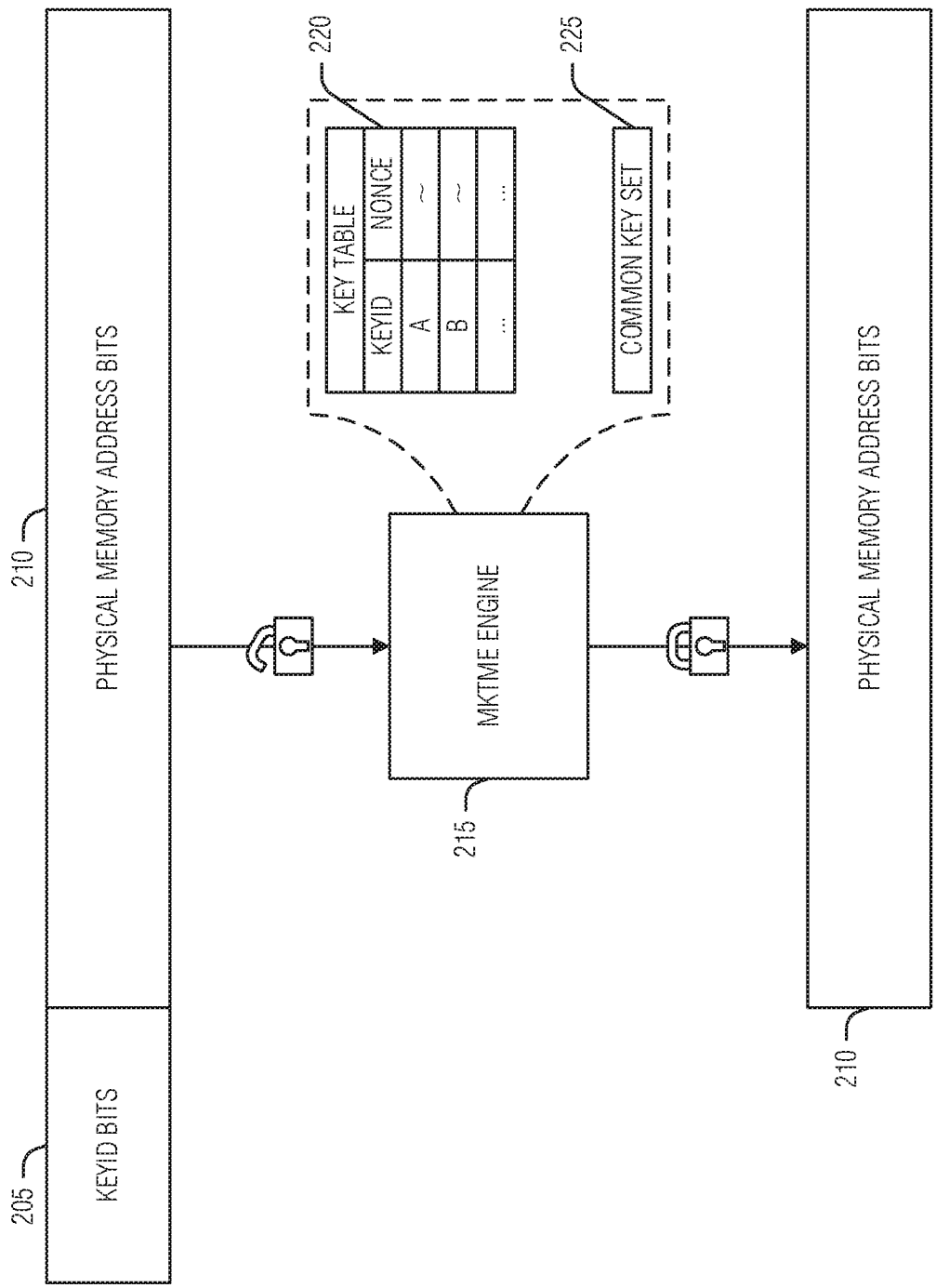
FIG. 2 illustrates a transition diagram of an example operation of a multiple key total memory encryption (MKTME) implementing multi-tenant cryptographic memory isolation, according to an embodiment.

FIG. 2 illustrates a transition diagram of an example operation of a multiple key total memory encryption (MKTME) engine implementing multi-tenant cryptographic memory isolation, according to an embodiment. An encrypted memory address is transmitted by a memory consumer (e.g., CPU) to main memory. The encrypted memory address includes keyid bits 205 and physical memory address bits 210.

The MKTME engine 215 uses the keyid bits 205 to lookup a nonce corresponding to the keyid in a secure key table 220. The key table 220 is secured by protected memory contained within the MKTME engine 215. Once the nonce is obtained, the MKTME engine 215 uses the nonce to provide tenant specific encryption for the data while sharing the common key 225 amongst several tenants. Again, looking at the AES-XTS encryption operation:

T=AES (K2, Tweak)
PP=P XOR T
CC=AES (K1, PP)
C=CC XOR T where P is the plaintext, C is the ciphertext generated, and K1 and K2 are domain-specific keys; cryptographic isolation may be achieved using a unique K1, K2 pair per domain. This is the traditional MKTME model. However, to increase the number of tenants supported by a same-sized key table 220, cryptographic isolation is maintained by using a single common key 225 and ensuring that the tweak is unique amongst the tenants. In an example, the tweak is constructed using the encrypted memory address. The higher order bits in the address are used to carry the keyid (e.g., keyid bits 205) to indicate which domain the access originated from. The tweak is constructed from both the keyid bits 205 and the physical memory address bits 210 This ensures that the same data from different domains is encrypted differently. However, using this construction of the tweak may be vulnerable to several attacks. First, the keyid space is limited and an attacker with physical access to the system (e.g., a CSP) may conduct a brute force attack on the keyid to get decrypted values for a given ciphertext with all possible keyids. In this attack, one out of the possible values generated will be the plaintext belonging to the cryptographic domain owning the ciphertext. Second, the keyid is generally a limited resource that may be re-assigned to mutually distrusting domains at different points in time. Thus, a malicious entity may capture ciphertext from a cryptographic domain and insert it later in a different cryptographic domain to which the same keyid is assigned at a later point in time, thereby resulting in successful cross-domain attack.

To defend against such attacks, the tweak may incorporate an ephemeral value which is generated each time a keyid is programmed (e.g., registered, assigned, made ready to use, etc.). In an example, the nonce may be a 64-bit value that is programmed each time a domain is programmed. In an example, the nonce is chosen randomly (e.g., by a CPU, the MKTME engine 215, etc.) and programmed along with other keyid information in the key table 220.

To create the tweak, the MKTME engine 215 may, upon receiving a memory request, construct the tweak as follows:
Tweak=KEYID_NONCE|KEYID|ADDRESS_BITS
where '|' is the concatenation operator. This unique construction of the tweak gives cryptographic isolation (e.g., separation) between multiple distrusting domains running on the same hardware, such as in a cloud environment.

Because the nonce, and not an entire key, is stored in the key table 220, the same storage size (e.g., in terms of bits, bytes, etc.) may scale to many more tenants than traditional MKTME solutions. For example, given a 64-bit nonce and a 256-bit key set—such as a single 256-bit key or two 128-bit keys (K1 and K2) in the case of AES-XTS, four times as many tenants may be serviced by the technique described herein versus traditional MKTME formulations. Further, in addition to providing a scalable option multi-tenant cryptographic memory isolation, the overall hardware complexity is reduced by eliminating hardware for on-the-fly key expansion—to take a key from a different key schedule for each of its rounds—with a multi-key cryptographic engine, which is used in current cryptographic solutions to support full memory bandwidth.

Figure 3:
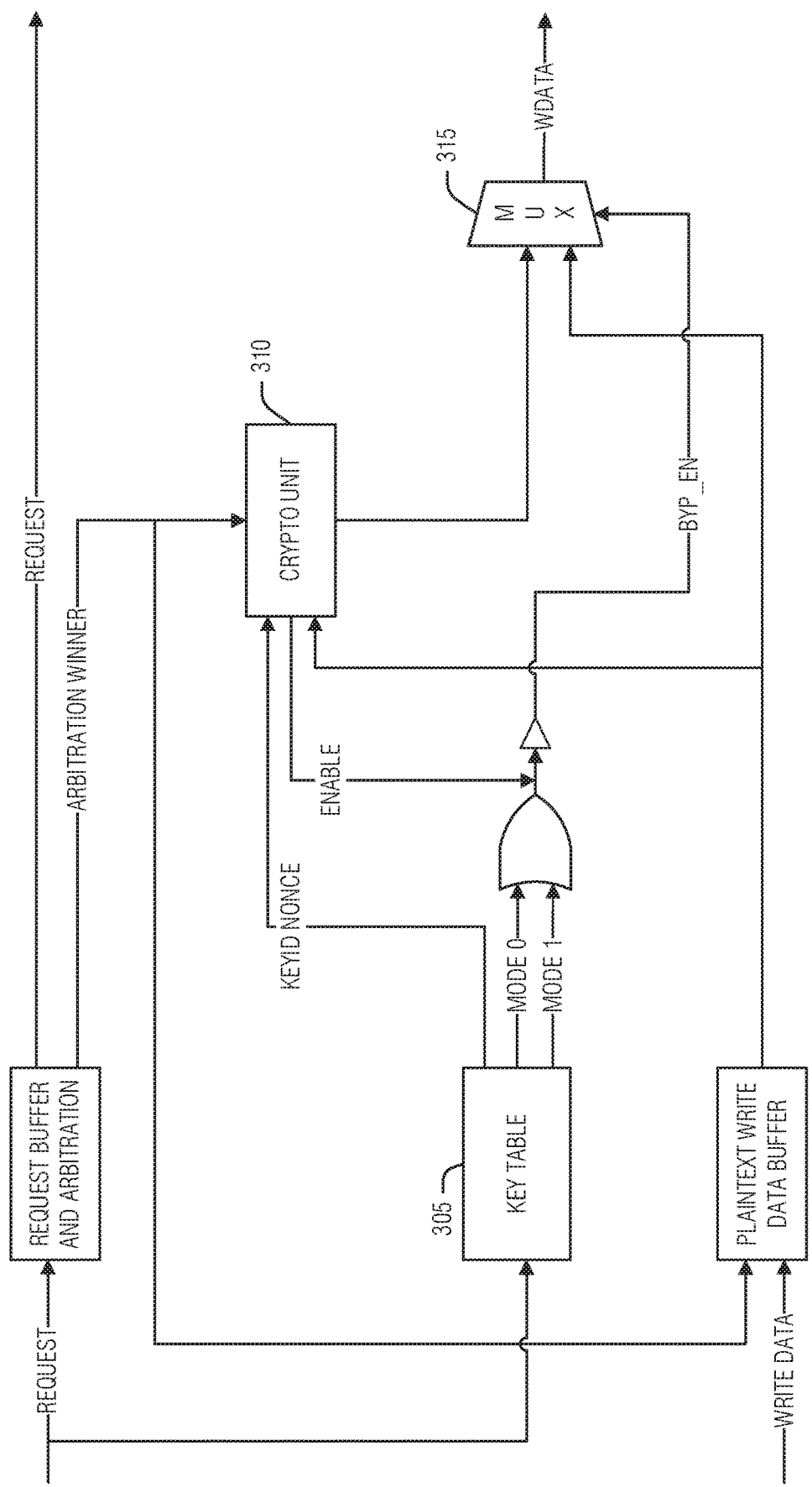
FIG. 3 illustrates an example of MKTME circuitry encrypting data to implement multi-tenant cryptographic memory isolation, according to an embodiment.

FIG. 3 illustrates an example of MKTME circuitry encrypting data to implement multi-tenant cryptographic memory isolation, according to an embodiment. When the request arrives at the MKTME circuitry, the keyid is decoded from the address (e.g., encrypted memory address) and used to locate the keyid nonce from the key table 305. The keyid nonce is then provided to the cryptographic unit 310. The data to be written is buffered and is also provided to the cryptographic unit 310. The cryptographic unit 310 provides the encrypted data to the multiplexer 315. The cryptographic unit 310 uses the keyid nonce, the address, and a common key to encrypt the write data. In an encrypted operation, the multiplexer 315 forwards the encrypted data as wdata to the main memory. In an example, the cryptographic unit 310 may enable some, or all, of the write data to bypass encryption. In this example, the multiplexer 315 is signaled of the bypass enablement and forwards raw (e.g., plaintext) data from the buffer to the main memory as the wdata. This structure allows for a simple and yet powerful hardware encryption engine to flexibly allow data to be encrypted and decrypted when being stored to or read from main memory.

FIG. 4 illustrates an example matrix of a data structure to program an MKTME engine, according to an embodiment. The data structure illustrated in FIG. 4 differs from a traditional MKTME PCONFIG instruction data structure by omitting the USUPP_KEYID_KEY and USUPP_KEYID_TWEAK_KEY fields in the last 128 bits, resulting in a 64-byte structure over the 128-byte structure of traditional MKTME PCONFIG. This is possible because, as noted above, individual domains share a common key, and thus it is not provided as part of the PCONFIG domain registration to the MKTME. In an example, the single key used by the MKTYME may be programmed once at bootup by core ucode (e.g., IA32_TME_ACTIVATE MSR).

The domain unique tweak is created for the domain as part of the registration process. However, in an example, the PCFONIG data structure illustrated may be extended to accept a tweak from the registrant. In an example, registration (e.g., programming the KEYID and the associated algorithm) includes creating a random value for the nonce that will be used to construct the tweak. In an example, the nonce is 64 bits long, a value considered sufficient to provide enough entropy. However, larger or smaller nonces may be used to balance security with scalability on the MKTME. However, at 64 bits, the MKTME may support four times as many tenants than a traditional MKTME using 256-bit keys (such as the two 128-bit domain specific keys for AES-XTS) with the same hardware.

Figure 5:
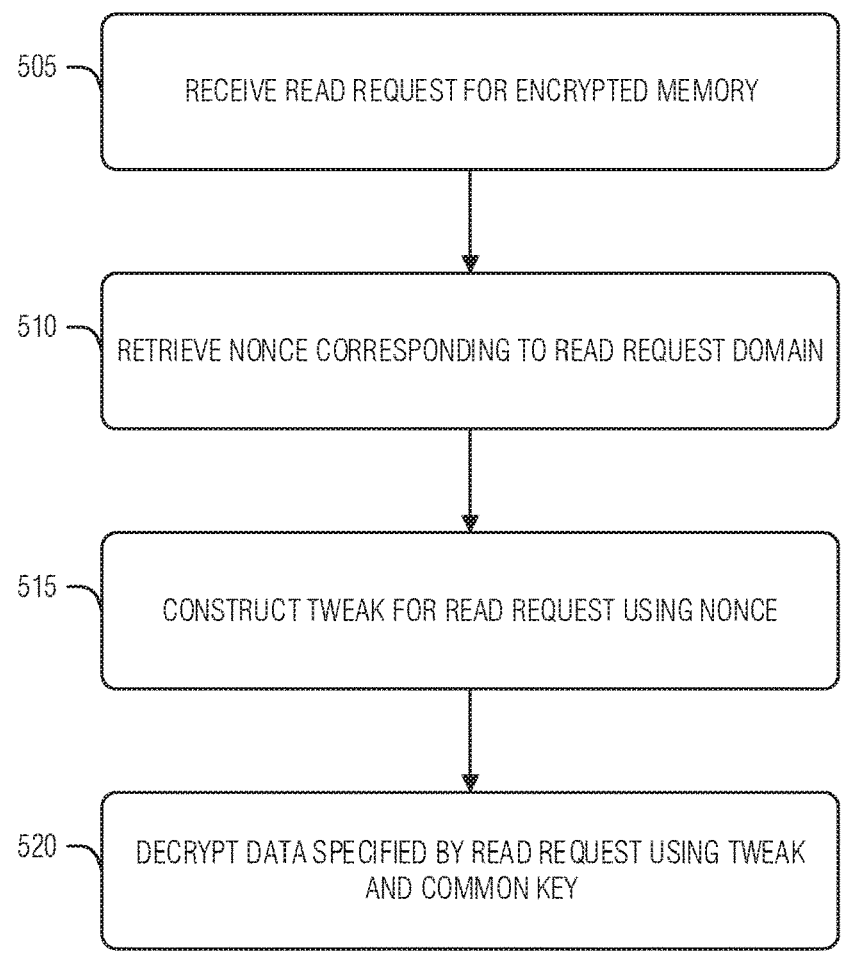
FIG. 5 illustrates a flow diagram of an example of a method for multi-tenant cryptographic memory isolation, according to an embodiment.

FIG. 5 illustrates a flow diagram of an example of a method 500 for multi-tenant cryptographic memory isolation, according to an embodiment. The operations of the method 500 are performed by computer hardware, such as that described above with respect to FIGS. 1-4 or below with respect to FIG. 6 (e.g., circuitry).

At operation 505, a read request for encrypted memory is obtained (e.g., received or retrieved). For example, MKTME circuitry may receive the read request for encrypted memory. Here, the read request includes an encrypted memory address. The encrypted memory address has a sequence of keyid bits and physical address bits. In an example, the MKTME circuitry is on a communications path between main memory and requesting hardware.

At operation 510, a nonce corresponding to the read request domain is retrieved. For example, the MKTME circuitry retrieves the keyid-nonce from a key table using the keyid bits. In an example, the keyid-nonce is 64 bits. In an example, the method 500 includes keyid-nonce programming operations, such as receiving a key-update command that includes the keyid bits, creating the keyid-nonce in response to the key-update command, and storing the keyid bits and the keyid-nonce in the key table. In an example, creating the keyid-nonce includes generating a random number.

At operation 515, a tweak for the read request is constructed using the nonce. For example, the MKTME circuitry constructs the tweak from the keyid-nonce, the keyid bits, and the physical address bits. In an example, the tweak is a concatenation of the keyid-nonce, the keyid bits, and the physical address bits.

At operation 520, data specified by the read request in main memory is decrypted using the tweak and a common key. For example, the MKTME circuitry uses the tweak and the common key to decrypt the data specified by the read request. In an example, the decryption is accomplished in accordance with AES-XTS decryption, where the AES-XTS keys K1 and K2 are in the common key set and the tweak is unique across mutually distrusting domains.

The operations pertain to read (e.g., decryption) operations. To perform write (e.g., encryption), the method 500 may include the operations of receiving a write request for the encrypted memory the write request including the encrypted memory address, retrieving the keyid-nonce from the key table using the keyid bits, constructing the tweak from the keyid-nonce, the keyid bits, and the physical address bits, and encrypting data specified by the write request using the common key and the tweak.

Figure 6:
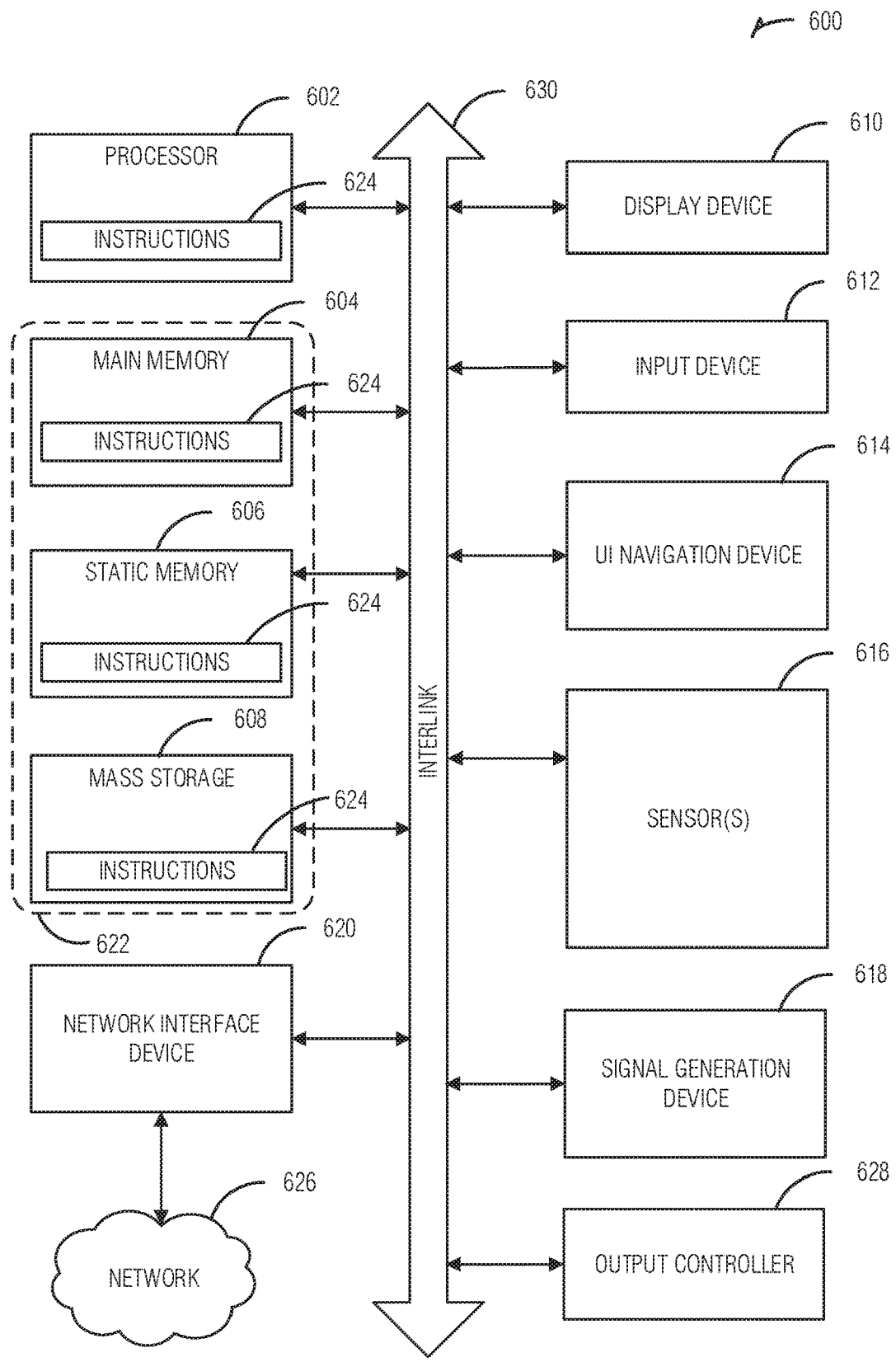
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be, taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (CPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

ADDITIONAL NOTES & EXAMPLES

Example 1 is a device for multi-tenant cryptographic memory isolation, the device comprising: storage; and processing circuitry to: receive a read request for encrypted memory, the read request including an encrypted memory address, the encrypted memory address including a sequence of keyid bits and physical address bits; retrieve a keyid-nonce from a key table using the keyid bits; construct a tweak from the keyid-nonce, the keyid bits, and the physical address bits; and decrypt, using the tweak and a common key, data specified by the read request with the encrypted memory address.

In Example 2, the subject matter of Example 1 includes, wherein the tweak is a concatenation of the keyid-nonce, the keyid bits, and the physical address bits.

In Example 3, the subject matter of Examples 1-2 includes, wherein the keyid-nonce is sixty-four bits.

In Example 4, the subject matter of Examples 1-3 includes, wherein, to decrypt the data using the tweak and the common key, the processing circuitry performs Advanced Encryption Standard (AES) XEX-based tweaked-codebook mode with ciphertext stealing (XTS) (AES-XTS) decryption modified such that the common key is used for both K1 and K2, and wherein the tweak is unique across mutually distrusting domains.

In Example 5, the subject matter of Examples 1-4 includes, wherein the processing circuitry is to: receive a key-update command, the key-update command including keyid bits; create a keyid-nonce in response to the key-update command; and store the keyid bits and the keyid-nonce in the key table.

In Example 6, the subject matter of Example 5 includes, wherein, to create the keyid-nonce, the processing circuitry generates a random number.

In Example 7, the subject matter of Examples 1-6 includes, wherein the device is on a communications path between main memory and requesting hardware.

In Example 8, the subject matter of Examples 1-7 includes, wherein the processing circuitry is to: receive, by the MKTME circuitry, a write request for the encrypted memory, the write request including the encrypted memory address; retrieve, by the MKTME circuitry, the keyid-nonce from the key table using the keyid bits; construct, by the MKTME circuitry, the tweak from the keyid-nonce, the keyid bits, and the physical address bits; and encrypt, by the MKTME circuitry using the tweak and the common key, data specified by the write request with the encrypted memory address.

Example 9 is a method for multi-tenant cryptographic memory isolation, the method comprising: receiving, by multiple key total memory encryption (MKTME) circuitry, a read request for encrypted memory, the read request including an encrypted memory address, the encrypted memory address including a sequence of keyid bits and physical address bits; retrieving, by the MKTME circuitry, a keyid-nonce from a key table using the keyid bits; constructing, by the MKTME circuitry, a tweak from the keyid-nonce, the keyid bits, and the physical address bits; and decrypting, by the MKTME circuitry using the tweak and a common key, data specified by the read request with the encrypted memory address.

In Example 10, the subject matter of Example 9 includes, wherein the tweak is a concatenation of the keyid-nonce, the keyid bits, and the physical address bits.

In Example 11, the subject matter of Examples 9-10 includes, wherein the keyid-nonce is sixty-four bits.

In Example 12, the subject matter of Examples 9-11 includes, wherein decrypting the data using the tweak and the common key includes performing Advanced Encryption Standard (AES) XEX-based tweaked-codebook mode with ciphertext stealing (XTS) (AES-XTS) decryption modified such that the common key is used for both K1 and K2, and wherein the tweak is unique across mutually distrusting domains.

In Example 13, the subject matter of Examples 9-12 includes, receiving a key-update command, the key-update command including keyid bits; creating a keyid-nonce in response to the key-update command; and storing the keyid bits and the keyid-nonce in the key table.

In Example 14, the subject matter of Example 13 includes, wherein creating the keyid-nonce includes generating a random number.

In Example 15, the subject matter of Examples 9-14 includes, wherein the MKTME circuitry is on a communications path between main memory and requesting hardware.

In Example 16, the subject matter of Examples 9-15 includes, receiving, by the MKTME circuitry, a write request for the encrypted memory, the write request including the encrypted memory address; retrieving, by the MKTME circuitry, the keyid-nonce from the key table using the keyid bits; constructing, by the MKTME circuitry, the tweak from the keyid-nonce, the keyid bits, and the physical address bits; and encrypting, by the MKTME circuitry using the tweak and the common key, data specified by the write request with the encrypted memory address.

Example 17 is a system comprising means to perform any method of Examples 9-16.

Example 18 is at least one machine readable medium including instructions that, when executed by processing circuitry, cause the processing circuitry to perform any method of Examples 9-16.

Example 19 is at least one machine readable medium including instructions for multi-tenant cryptographic memory isolation, the instructions, when executed by processing circuitry, cause the processing circuitry to perform operations comprising: receiving, by multiple key total memory encryption (MKTME) circuitry, a read request for encrypted memory, the read request including an encrypted memory address, the encrypted memory address including a sequence of keyid bits and physical address bits; retrieving, by the MKTME circuitry, a keyid-nonce from a key table using the keyid bits; constructing, by the MKTME circuitry, a tweak from the keyid-nonce, the keyid bits, and the physical address bits; and decrypting, by the MKTME circuitry using the tweak and a common key, data specified by the read request with the encrypted memory address.

In Example 20, the subject matter of Example 19 includes, wherein the tweak is a concatenation of the keyid-nonce, the keyid bits, and the physical address bits.

In Example 21, the subject matter of Examples 19-20 includes, wherein the keyid-nonce is sixty-four bits.

In Example 22, the subject matter of Examples 19-21 includes, wherein decrypting the data using the tweak and the common key includes performing Advanced Encryption Standard (AES) XEX-based tweaked-codebook mode with ciphertext stealing (XTS) (AES-XTS) decryption modified such that the common key is used for both K1 and K2, and wherein the tweak is unique across mutually distrusting domains.

In Example 23, the subject matter of Examples 19-22 includes, wherein the operations further comprise: receiving a key-update command, the key-update command including keyid bits; creating a keyid-nonce in response to the key-update command; and storing the keyid bits and the keyid-nonce in the key table.

In Example 24, the subject matter of Example 23 includes, wherein creating the keyid-nonce includes generating a random number.

In Example 25, the subject matter of Examples 19-24 includes, wherein the MKTME circuitry is on a communications path between main memory and requesting hardware.

In Example 26, the subject matter of Examples 19-25 includes, wherein the operations further comprise: receiving, by the MKTME circuitry, a write request for the encrypted memory, the write request including the encrypted memory address; retrieving, by the MKTME circuitry, the keyid-nonce from the key table using the keyid bits; constructing, by the MKTME circuitry, the tweak from the keyid-nonce, the keyid bits, and the physical address bits; and encrypting, by the MKTME circuitry using the tweak and the common key, data specified by the write request with the encrypted memory address.

Example 27 is a system for multi-tenant cryptographic memory isolation, the system comprising: means for receiving, by multiple key total memory encryption (MKTME) circuitry, a read request for encrypted memory, the read request including an encrypted memory address, the encrypted memory address including a sequence of keyid bits and physical address bits; means for retrieving, by the MKTME circuitry, a keyid-nonce from a key table using the keyid bits; means for constructing, by the MKTME circuitry, a tweak from the keyid-nonce, the keyid bits, and the physical address bits; and means for decrypting, by the MKTME circuitry using the tweak and a common key, data specified by the read request with the encrypted memory address.

In Example 28, the subject matter of Example 27 includes, wherein the tweak is a concatenation of the keyid-nonce, the keyid bits, and the physical address bits.

In Example 29, the subject matter of Examples 27-28 includes, wherein the keyid-nonce is sixty-four bits.

In Example 30, the subject matter of Examples 27-29 includes, wherein the means for decrypting the data using the tweak and the common key include means for performing Advanced Encryption Standard (AES) XEX-based tweaked-codebook mode with ciphertext stealing (XTS) (AES-XTS) decryption modified such that the common key is used for both K1 and K2, and wherein the tweak is unique across mutually distrusting domains.

In Example 31, the subject matter of Examples 27-30 includes, means for receiving a key-update command, the key-update command including keyid bits; means for creating a keyid-nonce in response to the key-update command; and means for storing the keyid bits and the keyid-nonce in the key table.

In Example 32, the subject matter of Example 31 includes, wherein the means for creating the keyid-nonce include means for generating a random number.

In Example 33, the subject matter of Examples 27-32 includes, wherein the MKTME circuitry is on a communications path between main memory and requesting hardware.

In Example 34, the subject matter of Examples 27-33 includes, means for receiving, by the MKTME circuitry, a write request for the encrypted memory, the write request including the encrypted memory address; means for retrieving, by the MKTME circuitry, the keyid-nonce from the key table using the keyid bits; means for constructing, by the MKTME circuitry, the tweak from the keyid-nonce, the keyid bits, and the physical address bits; and means for encrypting, by the MKTME circuitry using the tweak and the common key, data specified by the write request with the encrypted memory address.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for multi-tenant cryptographic memory isolation, the device comprising:
    storage that includes a key table;
    interface circuitry to facilitate an interface to form an interconnect between memory hardware and a user of the memory hardware; and
    processing circuitry to:
        receive, on the interface:
            a write request, by a tenant of several tenants, for the memory hardware from the user of the memory hardware; and
            data corresponding to the write request;
        extract a tenant identifier (ID) from the write request;
        obtain a nonce for the tenant from the key table using the tenant ID as an index, the key table being writable to store new keyed-nonces; and
        encrypt the data, creating encrypted data, using the nonce for storage in the memory hardware, wherein, to encrypt the data using the nonce, the processing circuitry is configured to:
            combine the nonce with the tenant ID and physical address from the write request to create a tweak; and
            encrypt the data using the tweak.

2. The device of claim 1, comprising an encryption engine, wherein, to encrypt the data using the tweak, the processing circuitry is configured to use the tweak and a common key as parameters to the encryption engine.

3. The device of claim 2, wherein the encryption engine implements Advanced Encryption Standard (AES) XEX-based tweaked-codebook mode with ciphertext stealing (XTS) (AES-XTS) decryption modified such that the common key is used for both K1 and K2.

4. The device of claim 2, wherein the write request is an encrypted memory write request based on an address of the write request, the address including bits for the tenant ID and bits for a physical address of the memory hardware.

5. The device of claim 4, wherein the processing circuitry is configured to bypass the encryption engine in response to a second write request being an unencrypted memory write request.

6. The device of claim 1, wherein, to combine the nonce with the tenant ID and physical address, the processing circuitry is configured to concatenate bits of the nonce to bits of the tenant ID to bits of the physical address.

7. The device of claim 1, wherein the processing circuitry is configured to place the encrypted data on the interconnect along with the write request using the interface.

8. The device of claim 1, wherein the user of the memory hardware is a central processing unit (CPU), a graphics processing unit (GPU), or a network interface device.

9. A method for multi-tenant cryptographic memory isolation, the method comprising:
    receiving, on an interface forming an interconnect between memory hardware and a user of the memory hardware, a write request, by a tenant of several tenants, for the memory hardware from the user of the memory hardware;

receiving, on the interface, data corresponding to the write request;

extracting a tenant identifier (ID) from the write request;

obtaining a nonce for the tenant from a key table using the tenant ID as an index, the key table being writable to store new keyed-nonces; and encrypting the data, created encrypted data, using the nonce for storage in the memory hardware, wherein encrypting the data using the nonce includes:

combining the nonce with the tenant ID and physical address from the write request to create a tweak; and encrypting the data using the tweak.

10. The method of claim 9, wherein encrypting the data using the tweak includes using the tweak and a common key as parameters to an encryption engine.

11. The method of claim 10, wherein the encryption engine implements Advanced Encryption Standard (AES) XEX-based tweaked-codebook mode with ciphertext stealing (XTS) (AES-XTS) decryption modified such that the common key is used for both K1 and K2.

12. The method of claim 10, wherein the write request is an encrypted memory write request based on an address of the write request, the address including bits for the tenant ID and bits for a physical address of the memory hardware.

13. The method of claim 12, comprising bypassing the encryption engine in response to a second write request being an unencrypted memory write request.

14. The method of claim 9, wherein combining the nonce with the tenant ID and physical address includes concatenating bits of the nonce to bits of the tenant ID to bits of the physical address.

15. The method of claim 9, comprising placing the encrypted data on the interconnect along with the write request using the interface.

16. The method of claim 9, wherein the user of the memory hardware is a central processing unit (CPU), a graphics processing unit (GPU), or a network interface device.

17. At least one non-transitory machine-readable medium including instructions for multi-tenant cryptographic memory isolation, the instructions, when executed by processing circuitry, cause the processing circuitry to perform operations comprising:

receiving, on an interface forming an interconnect between memory hardware and a user of the memory hardware, a write request, by a tenant of several tenants, for the memory hardware from the user of the memory hardware;

receiving, on the interface, data corresponding to the write request;

extracting a tenant identifier (ID) from the write request;

obtaining a nonce for the tenant from a key table using the tenant ID as an index, the key table being writable to store new keyed-nonces; and encrypting the data, created encrypted data, using the nonce for storage in the memory hardware, wherein encrypting the data using the nonce includes:

combining the nonce with the tenant ID and physical address from the write request to create a tweak; and encrypting the data using the tweak.

18. The at least one non-transitory machine-readable medium of claim 17, wherein encrypting the data using the tweak includes using the tweak and a common key as parameters to an encryption engine.

19. The at least one non-transitory machine-readable medium of claim 18, wherein the encryption engine implements Advanced Encryption Standard (AES) XEX-based tweaked-codebook mode with ciphertext stealing (XTS) (AES-XTS) decryption modified such that the common key is used for both K1 and K2.

20. The at least one non-transitory machine-readable medium of claim 18, wherein the write request is an encrypted memory write request based on an address of the write request, the address including bits for the tenant ID and bits for a physical address of the memory hardware.

21. The at least one non-transitory machine-readable medium of claim 20, comprising bypassing the encryption engine in response to a second write request being an unencrypted memory write request.

22. The at least one non-transitory machine-readable medium of claim 17, wherein combining the nonce with the tenant ID and physical address includes concatenating bits of the nonce to bits of the tenant ID to bits of the physical address.

23. The at least one non-transitory machine-readable medium of claim 17, comprising placing the encrypted data on the interconnect along with the write request using the interface.

* * * * *